US005490534A

United States Patent [19]

Van Rens

[11] Patent Number: 5,490,534

[45] Date of Patent: Feb. 13, 1996

[54] DOUBLE SOLENOID VALVE ACTUATOR

[75] Inventor: Russell J. Van Rens, Milwaukee, Wis.

[73] Assignee: Outboard Marine Corporation, Waukegan, Ill.

[21] Appl. No.: 169,537

[22] Filed: Dec. 17, 1993

Related U.S. Application Data

[63] Continuation of Ser. No. 874,755, Apr. 27, 1992, abandoned.

[51] Int. Cl.$^6$ ..................................................... F16K 31/00

[52] U.S. Cl. ........................ 137/1; 251/129.1; 251/129.19

[58] Field of Search ............................ 251/129.1, 129.15, 251/129.19, 129.09; 137/1, 14

[56] References Cited

U.S. PATENT DOCUMENTS

| | | | |
|---|---|---|---|
| 2,980,139 | 4/1961 | Lynn | 251/129.19 |
| 3,190,608 | 6/1965 | Hassa | 251/129.1 |
| 3,883,114 | 5/1975 | Harris et al. | 251/366 |
| 4,515,343 | 5/1985 | Pischinger et al. | 251/48 |
| 4,546,955 | 10/1985 | Beyer et al. | 251/129.1 |
| 4,682,574 | 7/1987 | Kreuter | 251/129.16 |
| 4,715,330 | 12/1987 | Buchl | 251/129.16 |
| 4,723,755 | 2/1988 | Ishigaki | 251/129.19 |
| 4,749,167 | 6/1988 | Gottschall | 251/337 |
| 4,831,973 | 5/1989 | Richeson, Jr. | 251/129.1 |

FOREIGN PATENT DOCUMENTS

| | | | |
|---|---|---|---|
| 0559478 | 9/1923 | France | 251/129.19 |

*Primary Examiner*—A. Michael Chambers
*Attorney, Agent, or Firm*—Greer, Burns & Crain, Ltd.

[57] ABSTRACT

Apparatus for moving a reciprocating object, such as a spring biased poppet valve, between a rest and a second position. The apparatus includes two solenoids, each of which has a core, with one of the solenoids having a larger core and imparting greater force than the other. The solenoids are mounted in line with one another so that the core of one solenoid is adapted to contract the core of the other, with the latter being adapted to contact the object. A first solenoid provides a driving force to the object to move it in opposition to a biasing force and the second solenoid holds the object in its moved position when the first solenoid is de-energized. When the core of the first solenoid is in its rest position, it is out of contact with the core of the second solenoid and this enables the biasing force of the object to rapidly move to its rest position upon de-energization of the second solenoid.

34 Claims, 3 Drawing Sheets

DOUBLE SOLENOID VALVE ACTUATOR

This application is a file-wrapper continuation of Ser. No. 07/874,755, now abandoned, filed Apr. 27, 1992.

CROSS REFERENCE TO RELATED APPLICATIONS

Title: VACUUM VALVE DESIGN FOR DIE CASTING
Inventors: Nelson, VanRens
Ser. No.: 07/874,364, now abandoned
Title: SEALED SHOT SLEEVE FOR VACUUM DIE CASTING
Inventors: Schults, Smith, Van Rens
Ser. No. 07/874,740, now U.S. Pat. No. 5,203,480
Title: VACUUM VALVE FOR DIE CASTING
Inventors: Van Rens, Rumford, Schultz
Ser. No. 07/874,629, now U.S. Pat. No. 5,203,396
Title: VACUUM DIE CASTING PROCESS
Inventors: Campbell et al.
Ser. No.: 07/874,648, now U.S. Pat. No. 5,219,409.

The present invention generally relates to solenoid actuators, and more particularly relates to a double solenoid actuator for use in moving a normally biased reciprocating object between a rest position and a second position.

There have been many solenoid designs made over the years, and the solenoids are designed to operate with varying response times and applied forces. Additionally, some are designed to have internal biasing means for returning a movable core to a rest position, as well as different lengths of the stroke of the core and the like. Some solenoids are operable to hold a core in a predetermined position when energized, and to release the core to return to a rest position when de-energized.

The time that is required for the core to move from an actuated position to a rest position is often referred to as the response time and the response time generally increases with the mass of the core. Thus, is a solenoid is designed to create a relatively large force to overcome the resistance of a relatively strong spring, for example, a larger core may be necessary, which then necessarily increases the response time of the solenoid core and any mechanism that is coupled to it. A larger spring may speed up the response time, but there is a problem associated with increasing the force of the spring because additional force will be required to overcome the resistance of the spring.

This dilemma exists with respect to a poppet valve in an application relating to vacuum die casting of molten metal in a die casting apparatus. In such an apparatus, a vacuum is applied to the die cavity immediately prior to forcing a shot of molten metal into the cavity. In such a process of making a die casting, a plunger generally is used to inject a shot of molten metal that has been placed in a chamber ahead of the plunger and the plunger forces the molten metal into the cavity at extremely high pressure. It is generally done in a two stage operation in that the plunger is moved relatively slowly until the molten metal passes through the runners in the die and approaches the cavity, and the metal is then rapidly injected into the cavity.

It is generally recognized that a higher quality casting can be achieved by evacuating air from the cavity prior to the injection process. To apply the vacuum to the cavity, a valve mechanism is used which has an exterior face that is necessarily in communication with the cavity and will be contacted by metal during the injection process. It is very important that the valve close to a sealed position. In the past some vacuum die casting processes have used the force of the metal being injected into the cavity to close the vacuum valve. This has often created problems in that die casting material may enter the valve itself and prevent it from completely closing, or it may prevent subsequent proper operation of the valve. For this reason, it is highly desirable to insure that the valve is closed before metal reaches the die cavity and to this end, a fast acting valve is highly desirable. Pneumatic or hydraulic actuated poppet valves have been found to generally be too slow to insure reliable operation.

Accordingly, it is a primary object of the present invention to provide an apparatus for providing translating or reciprocating movement of an object that is biased against movement in a first direction and which will rapidly move the object in an opposite direction, which apparatus utilizes a pair of solenoids to move the object in the first direction.

A more detailed object of the present invention is to provide an apparatus for operating a translating poppet valve which is spring biased in a closed position, the apparatus being effective to open the valve against the spring force and yet be capable of closing the valve very rapidly.

Another object of the present invention is to provide an apparatus of the foregoing type which utilizes two solenoids to initially open the valve and hold it open, with the masses of the cores of the respective solenoids being determined to take advantage of the force and operating characteristics of each of the solenoids and yet enable very rapid closing of the valve when the solenoids are de-energized.

Still another object of the present invention lies in the provision of having a very forceful solenoid open the valve and a second solenoid that holds the valve open while releasing the first solenoid, with the second solenoid having a smaller core and therefore mass, which facilitates rapid closing of the valve when the second solenoid is de-energized.

Other objects and advantages will become apparent from the ensuing detailed description, while referring to the attached drawings, in which.

DETAILED DESCRIPTION

Broadly stated, the present invention is directed to an apparatus for moving a translating or reciprocating object between first and second positions, which in the case of a poppet valve is between the open and closed position. The apparatus includes two solenoids, each of which has a core, with one of the solenoids having a larger core and imparting greater force than the other. The solenoids are mounted in line with one another so that the core of one solenoid is adapted to contact the core of the other, with the latter being adapted to contact the object or poppet valve.

The arrangement and construction of the solenoids is such that a large driving force produced by a first solenoid is applied to the object to move it in opposition to a biasing force and the second solenoid is adapted to hold the object in its moved position when the one solenoid is de-energized. Another biasing means adapted to act on the core of the first solenoid will move it back to its rest position upon de-energization of the first solenoid. When the core of the first solenoid is in its rest position, it is out of contact with the core of the second solenoid and this enables the biasing force of the object to rapidly move to its rest position upon de-energization of the second solenoid.

While it should be understood that the arrangement is particularly suited to opening a poppet valve that is spring biased in its closed direction, it should be understood that the apparatus embodying the present invention is adapted to drive and hold objects other than a poppet valve, wherein a large force is needed to overcome an opposing force to initially move the object from a first to a second position, but which is adapted to quickly move the object back to the first or rest position when desired.

Figure 1:
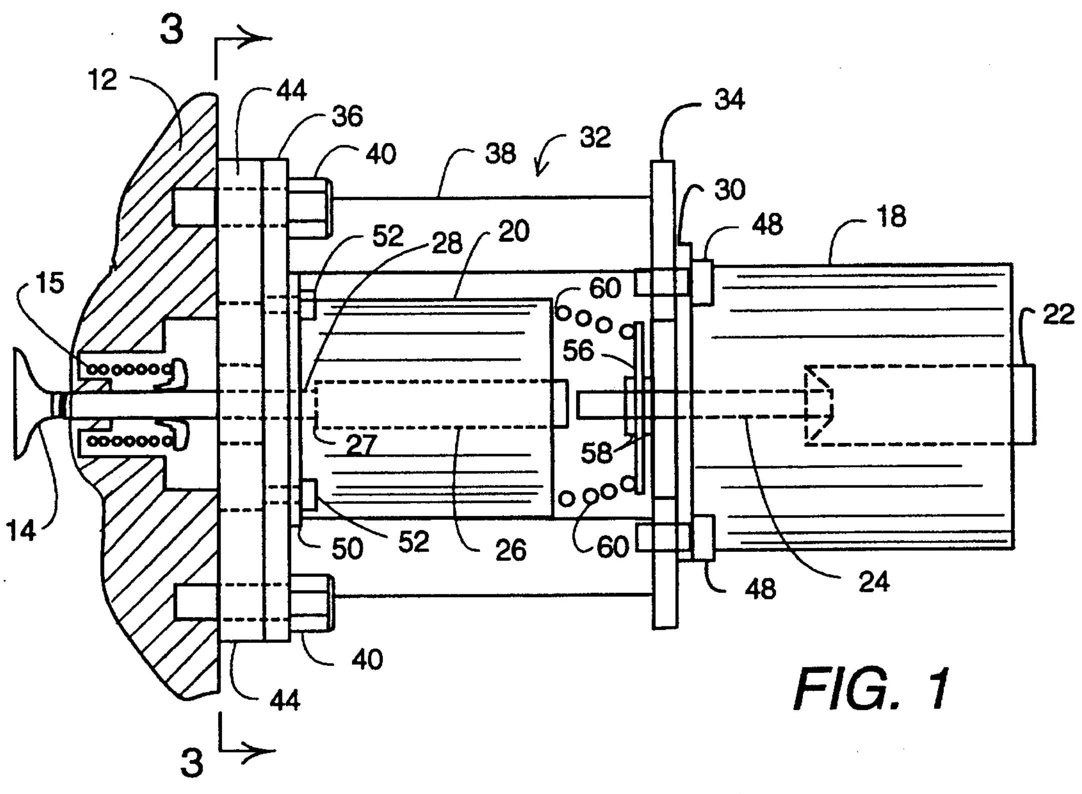
FIG. 1 is a side elevation, partially in section, of apparatus embodying the present invention, and shown with the solenoid cores in the retracted or rest position.

Turning now to the drawings, and particularly FIG. 1, the apparatus embodying the present invention is shown generally at 10, and is in association with a vacuum die, indicated generally at 12, that has a poppet valve structure, indicated generally at 14, with a connector 16 that connects the valve 14 with the apparatus 10. The valve structure 14 preferably has a spring 15 that is sufficiently strong to close the valve when the apparatus operates to permit closing of the valve or even forcefully close the valve if no spring 15 is provided.

The apparatus includes a first solenoid 18, and a second solenoid 20, with the first solenoid having a core 22 with an extension structure 24 integrally attached thereto. The solenoid 20 also has a core 26 with an extension 28, the outer end of which is connected to the connector 16 of the poppet valve structure 14. The respective cores 22 and 26 of the first and second solenoids are aligned with one another and the outer end of the extension 24 is adapted to contact the right end as shown of the core 26 during operation. The apparatus is shown in its rest or retracted position in FIG. 1, and in such position, there is a small space between the adjacent ends of the extension structure 24 and the core 26 of the solenoid 20. When the apparatus is operated, the core 22 is moved to the left, causing its extension 24 to engage the core 26 of the solenoid 20 and move it to the left. This in turn results in extension 20 to contact and open the valve 14.

As previously mentioned, in a typical application where a single solenoid which operates a valve, the solenoid is electrically energized and is adapted to push the valve open. The core of the solenoid is then returned by the valve spring upon closing. The time required to close the valve is determined by the spring force and the combined mass of the valve and the solenoid core. If it is desirable to reduce the closing time of the valve, it is either possible to increase the spring force or reduce the combined weight of the valve and core. By increasing the spring force, there is a corresponding necessary increase of the solenoid actuating force to overcome the spring and this higher force capability will require a heavier core which negates the stronger spring.

In accordance with an important aspect of the present invention, the mass of the core 22 is effectively removed from the valve and will not be required to be moved during closing of the valve and a shorter closing time will then result. A solenoid that has the capability to merely hold the valve open as opposed providing a force that moves the valve can have a lighter core. In this regard, the core 26 preferable has a weight of approximately 500 grams and the weight of the core 22 is preferably about 2000 grams, which is approximately four times greater than that of the core 26.

Figure 3:
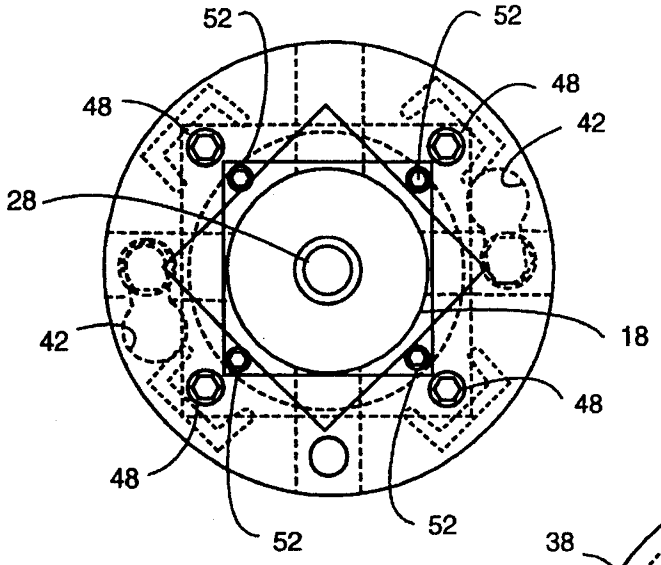
FIG. 3 is a right end view of the apparatus shown in FIG. 1.
Figure 4:
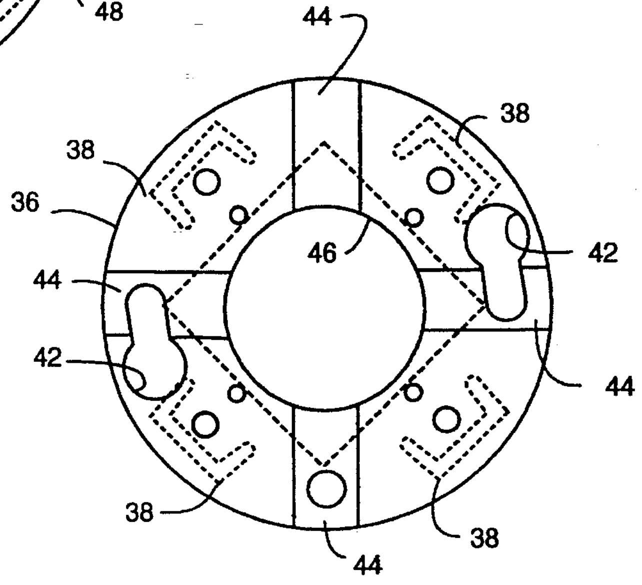
FIG. 4 is a view taken generally along the line 3—3 of FIG. 1.
Figure 5:
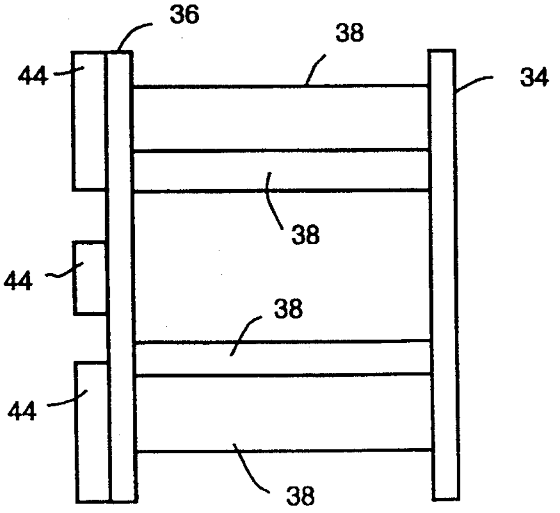
FIG. 5 is a side elevation of a mounting frame of the present invention; and, FIG. 6 is a side elevation of an alternative embodiment of the present invention.

The solenoid 18 has a mounting flange 30 that is generally rectangular in shape as shown in FIG. 3 and it is mounted to a frame structure, indicated generally at 32, which comprises a right end plate 34 and a left end plate 36. The end plates 34 and 36 are connected by four channels 38 which are preferably welded to the plates 34 and 36.

The left end plate 36 is mounted to the die 12 by a pair of bolts 40 which engage threads in the die 12 and each of the bolts 40 have an enlarged head which is adapted to be passed through the larger circular portion of an aperture 42 to the plate 36 and there is an extension of the aperture 42 which is smaller than the head of the bolt 40 so that the entire apparatus 10 can be easily removed from the die without completely removing the bolts 40. This is done by merely rotating the apparatus in a clockwise direction as shown in FIG. 3 and pulling the apparatus to the right as shown in FIG. 1.

In accordance with another important aspect of the present invention, four spacers 44 are provided to space the solenoids from the die to permit the airflow between the left plate 36 and the die for purposes of cooling the solenoids.

Each of the end plates 34 and 36 of the frame structure 32 have a large opening 46 to enable the extensions of the cores of the respective solenoids to pass therethrough. Each of the end plates 34 and 36 also have suitable apertures for receiving mounting bolts that mount the solenoids to the plates as illustrated in FIG. 1 and to this end, the mounting plate 30 of the solenoid 18 is mounted to the end plate 34 by bolts 48 and the solenoid 20 has a square mounting flange 50 for attachment of the solenoid to the end plate 36 by bolts 52.

Figure 2:
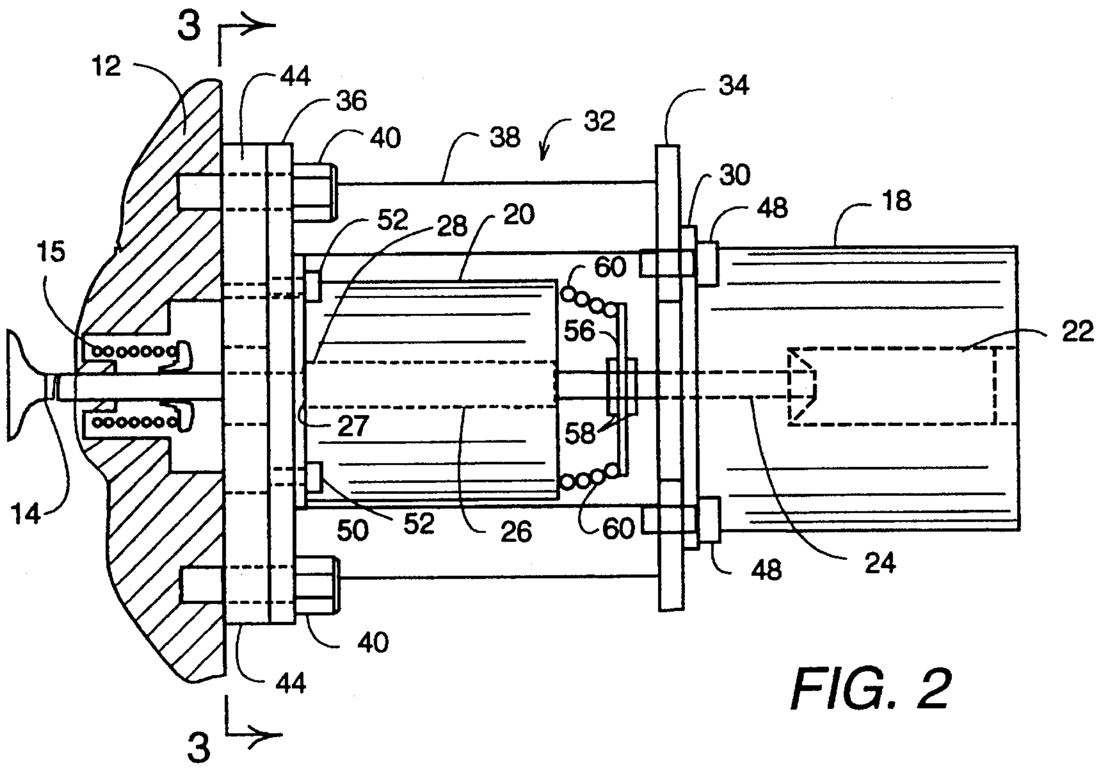
FIG. 2 is another side elevation of the apparatus shown in FIG. 1, and shown with the solenoid cores in their extended position.

The solenoid 18 is a larger solenoid that is manufactured by the Trombetta Co. and has a model No. Q515-A17, whereas the solenoid 20 is smaller and is preferably model No. Q513-A1. The operating characteristics of the two solenoids are different in that the solenoid 18 is operable to move the core 22 and extension to the left to contact the core 26 when energized and thereafter drive the core 26 and its extension, as well as the valve structure 14, to the left to open the valve. The solenoid 20 is of the type which does not provide a force to move the core 26 and extension to the left, but once the travel reaches the fully opened position, it is adapted to provide a holding force that is sufficient to hold the valve open when the solenoid 18 is de-energized. The plate 36 has an aperture that is large enough to receive the extension 28, but not large enough to pass an end 27 of the core 26. Thus, when the apparatus is operated, the core 26 is moved to the left whereby the end bottoms out against the plate 36 as shown in FIG. 2. The placement of the solenoid 20 is preferably determined to provide the maximum holding power of the solenoid 20.

In accordance with another important aspect of the present invention, the extension mechanism 24 has an annular plate 56 attached to it by threaded nuts 58 or the like located on opposite sides of the plate 56, so that it is secured to the extension and moves with it. A small coil spring 60 is also provided and bears upon the right end of the solenoid 20 and on the annular plate 56. When the solenoid 18 is de-energized, the spring 60 will move the extension mechanism 24 and core 22 to the right to its rest position as is desired. This has the effect of removing the mass of the core 22 and its extension from the mass of the core 26 and its extension mechanism 28 and valve mechanism 14 so that the spring biasing portion of the valve mechanism 14 will rapidly close the valve as is desired.

Figure 6:
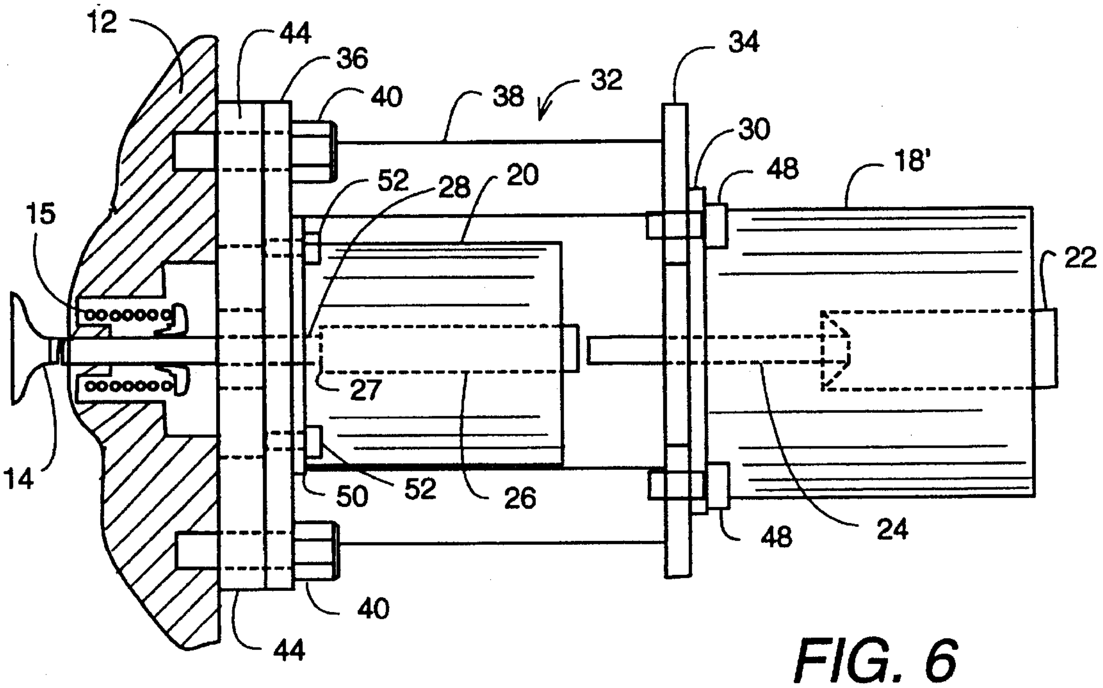

While the spring 60 provides a biasing force tending to separate the extension 24 from the core 26 due to the spring bearing against the rightward end of the solenoid 20 and urging the plate 56 to the right, it should also be understood that the spring 60, plate 56 and the nuts 58 could be eliminated if a solenoid 18' is a double acting solenoid, as shown in FIG. 6. In such event, activation of the solenoid to move the core to the left can be accomplished, followed by energization of the solenoid 20 to hold the valve in its open position, and then the double acting solenoid 18' can then be energized to move the core 22 and extension 24 to the right and out of contact with the core 26 of the solenoid 20.

Given the fact that in a metal die casting operation, the velocity of metal during the initial stroke is approximately 15 inches per second until the metal approaches the cavity through the runner and then it is moved at a higher rate of approximately 75–80 inches per second, it is necessary for reliable operation that the vacuum valve be closed in approximately 10–15 milliseconds. This is approximately one-half of the time required to fill the die during the final portion of the stroke. Also, given the fact that the valve is required to move approximately one-half inch between fully open and fully closed position, the apparatus embodied in the present invention insures reliable closing of the valve before a molten metal reaches it.

Figure 7:
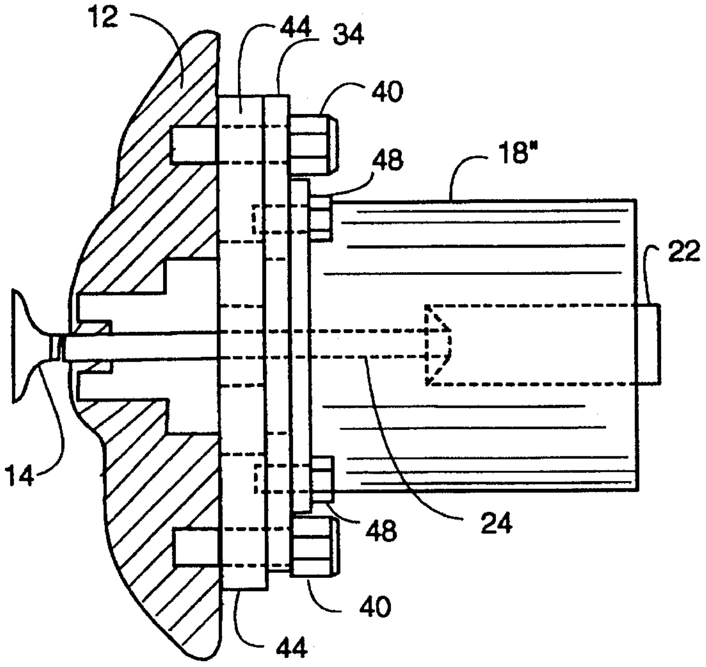
FIG. 7 is a side elevation of another alternative embodiment of the present invention.

It should also be understood that another alternative embodiment can comprise a single double acting solenoid 18" is used in place of the two solenoids 18 and 20, as shown in FIG. 7. This embodiment would also permit the elimination of the spring 15 of the valve 14, and would require that the valve connector be physically coupled to the extension 24, so that energization of the solenoid 18 to move its core and extension 24 to the right would result in closing of the valve 14. The solenoid must have the requisite operating characteristics to open and close the valve 14 within the times that have been specified.

From the foregoing detailed description, it should be appreciated that an apparatus for operating a poppet valve in a reliable manner has been shown and described which offers significant advantages over known prior techniques for doing so. The novel use of two solenoids enables effective opening of the valve, and by moving the first solenoid core out of contact with the core of the second solenoid, while the second solenoid holds the valve open, extremely fast valve closing is accomplished.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A method of controlling the movement of an object between first and second positions with first and second solenoid means respectively having first and second moveable core means that are operatively coupled to one another and with the object, with the first core means having a greater mass than the second, there being a second biasing means biasing the first core means away from the second core means, the object being biased by a first biasing means with a predetermined force toward said first position, said method quickly moving the object from said second to said first position, said method comprising the steps of:

energizing the first solenoid means to move the first core means into contact with and moving said second core means and also overcoming the predetermined biasing force of the first biasing means to thereby move the object to the second position;

energizing the second solenoid means to hold said second core means and the object in the second position;

de-energizing the first solenoid means so that the second biasing means moves the first core means out of contact with the second core means; and, de-energizing the second solenoid means so that the first biasing means moves the object rapidly toward the first position and simultaneously moving the second core means towards the first core means.

2. A method of controlling the movement of a control valve means between closed and open positions with first and second solenoid means respectively having first and second moveable core means that are operatively coupled to one another and with the control valve means, with the first core means having a greater mass than the second, there being a second biasing means biasing the first core means away from the second core means, the control valve means being biased by a first biasing means with a predetermined force toward said closed position, said method quickly moving the control valve means from said open to said closed position, said method comprising the steps of:

energizing the first solenoid means to move the first core means into contact with and moving said second core means and also covering the predetermined biasing force of the first biasing means to thereby move the control valve means to the open position;

energizing the second solenoid means to hold said second core means so that the control valve means is in the open position;

de-energizing the first solenoid means so that the second biasing means moves the first core means out of contact with the second core means; and, de-energizing the second solenoid means so that the first biasing means moves the control valve means rapidly toward the closed position and simultaneously moving the second core means towards the first core means.

3. Apparatus for providing a translational movement of an object from a rest position to a moved position, the object being located in a structure, which movement requires overcoming a first biasing means having a predetermined resistance to such movement of the object, the biasing means operating to return the object to its rest position when said apparatus is de-energized, said apparatus comprising:

a first solenoid means having a moveable first core means, and being adapted to bias and move said first core means in a first direction when energized;

a second solenoid means having a moveable second core means, and being adapted to bias said second core means in said first direction when energized;

means for mounting said first and second solenoid means such that said first core means is positioned to contact and move said second core means in said first direction when said first solenoid means is energized, said movement of said second core means also moving the object from its rest position; and means for moving said first core means in a second direction opposite the first direction to separate said first core means from said second core means.

4. Apparatus as defined in claim 3 wherein said mounting means is removably attachable to the structure, said first solenoid means and said second solenoid means being attached to said mounting means and having apertures located therein through which said first core means and said second core means can pass.

5. Apparatus as defined in claim 4 wherein said mounting means comprises a mounting plate having an aperture through which said first core means can pass, said first solenoid means being attached to said mounting plate means, said mounting means having a spacer means attached to said mounting plate means and being adapted to be attached to the structure, the length of said spacer means being greater than the length of the second solenoid means.

6. Apparatus as defined in claim 5 wherein said spacer means includes a second mounting plate means to which said second solenoid means is attached, said spacer means including means for attaching the same to the structure so that said second mounting plate means is spaced from the structure.

7. Apparatus as defined in claim 6 wherein said spacer means includes a plurality of elongated members extending between said first and second mounting plate means, said members being connected near the outer periphery of said first and second mounting plate means to permit said second solenoid means to be located within said outer periphery.

8. Apparatus as defined in claim 7 wherein said plurality of elongated members comprises four members, each of said member generally having a channel shaped cross section.

9. Apparatus as defined in claim 6 wherein said second mounting plate means includes at least two mounting apertures located near the outer periphery thereof, the mounting apertures having a first portion adapted to receive a threaded bolt means having a head for mounting the spacer means to the structure, and an enlarged portion through which the head of said bolt means can pass, so that rotation of the spacer means aligned each head with said enlarged portion of an aperture and permits easy removal of said mounting means from the structure.

10. Apparatus as defined in claim 3 wherein the mass of said first core means is larger than the mass of said second core means.

11. Apparatus as defined in claim 10 wherein said first core means is of sufficient length to contact said second core means and move said second core means and the object when said first solenoid means is energized, said second core means being moved to a position wherein said second solenoid means generates generally maximum holding force.

12. Apparatus as defined in claim 11, wherein the mass of said first core means is approximately 4 times greater than the mass of said second core means.

13. Apparatus as defined in claim 10 wherein said first solenoid means generates a biasing force that is sufficient to move said first core means, said second core means and said object when said first solenoid means is energized.

14. Apparatus as defined in claim 13 wherein said second solenoid means generates a biasing force that is sufficient to hold said second core means and the object in said moved position when said second solenoid means is energized and said first solenoid means is not energized.

15. Apparatus as defined in claim 11 wherein said first core means includes a outward radial extension located at the end portion thereof that extends from said first solenoid means in said first direction, said means for moving said first core means comprising a second biasing means adapted to contact said extension and one of said frame means, said first solenoid means and said second solenoid means and bias said first core means in said second direction.

16. Apparatus as defined in claim 15 wherein said second biasing means comprises a coil spring that has a biasing force that is substantially less than the first biasing means, said second biasing means having sufficient force to move said first core means in said second direction when said first solenoid means is not energized.

17. Apparatus as defined in claim 1 wherein the object is a poppet valve means, said first solenoid means generating a biasing force that is sufficient to move said first core means, said second core means and said poppet valve means when said first solenoid means is energized and said second solenoid means generates a biasing force that is sufficient to hold said second core means and the poppet valve means in said moved position when said second solenoid means is energized and said first solenoid means is not energized.

18. Apparatus as defined in claim 3 wherein said first solenoid means comprises a double acting solenoid adapted to forcefully move said first core means in first and second directions, and said means for moving said first core means in a second direction opposite the first direction to separate said first core means from said second core means comprises means for energizing said first solenoid means to move said first core means in said second direction.

19. Apparatus for opening an operable valve means against the force of a first biasing means whereby said biasing means is adapted to rapidly close the valve when said apparatus is de-energized, said apparatus comprising:

first and second solenoid means, respectively having first and second core means that are operatively coupled with one another and to said operable valve means, said second core means having less mass than said first core means;

said first solenoid means being adapted to overcome said first biasing means and open the operable valve means when said first solenoid means is energized;

said second solenoid means being adapted to hold said operable valve means in its open position when said second solenoid means is energized and said first solenoid means is not energized;

second biasing means for biasing said first core means of said first solenoid means out of contact with said second core means when said first solenoid means is de-energized;

whereby de-energization of said first solenoid means and said second solenoid means permits said first biasing means to rapidly close said operable valve means.

20. Apparatus as defined in claim 19 wherein said mounting means is removably attachable to the structure, said first solenoid means and said second solenoid means being attached to said mounting means and having apertures located therein through which said first core means and said second core means can pass.

21. Apparatus as defined in claim 20 wherein said mounting means comprises a mounting plate having an aperture through which said first core means can pass, said first solenoid means being attached to said mounting plate means, said mounting means having a spacer means attached to said mounting means having and being adapted to be attached to the structure, the length of said spacer means being greater than the length of the second solenoid means.

22. Apparatus as defined in claim 21 wherein said spacer means includes a second mounting plate means to which said second solenoid means is attached, said spacer means including means for attaching the same to the structure so that said second mounting plate means is spaced from the structure.

23. Apparatus as defined in claim 22 wherein said spacer means includes a plurality of elongated members extending between said first and second mounting plate means, said members being connected near the outer periphery of said first and second mounting plate means to permit said second solenoid means to be located within said outer periphery.

24. Apparatus as defined in claim 23 wherein said plurality of elongated members comprises four members, each of said member generally having a channel shaped cross section.

25. Apparatus as defined in claim 22 wherein said second mounting plate means includes at least two mounting apertures located near the outer periphery thereof, the mounting apertures having a first portion adapted to receive a threaded bolt means having a head for mounting the spacer means to the structure, and an enlarged portion through which the head of said bolt means can pass, so that rotation of the spacer means aligns each head with said enlarged portion of an aperture and permits easy removal of said mounting means from the structure.

26. Apparatus as defined in claim 19 wherein the mass of said first core means is larger than the mass of said second core means.

27. Apparatus as defined in claim 26 wherein said first core means is of sufficient length to contact said second core means and move said second core means and the object when said first solenoid means is energized.

28. Apparatus as defined in claim 27 wherein the mass of said first core means is approximately 4 times greater than the mass of said second core means.

29. Apparatus as defined in claim 27 wherein said first core means includes a outward radial extension located at the end portion thereof that extends from said first solenoid means in said first direction, said second biasing means being adapted to contact said extension and one of said frame means, said first solenoid means and said second solenoid means and bias said first core means in said second direction.

30. Apparatus for providing a translational movement of an object from a rest position to a moved position, the object being located in a structure, which movement requires overcoming a first biasing means having a predetermined resistance to such movement of the object, the biasing means operating to return the object to its rest position when said apparatus is de-energized, said apparatus comprising:

a first solenoid means having a moveable first core means, and being adapted to selectively bias said first core means in a first direction and a second direction;

a second solenoid means having a moveable second core means, and being adapted to bias said second core means in said first direction when energized, said second core means being independently moveable relative to said first core means;

means for mounting said solenoid means such that said first core means is positioned to contact and move said second core means in said first direction when said first solenoid means is energized, said movement of said second core means also moving the object from its rest position.

31. A vacuum die casting valve opening and closing apparatus, the valve being a poppet valve that is capable of translational movement between its open and closed positions, said apparatus comprising:

double acting solenoid means having a core means that is moveable in a first direction to fully open said poppet valve and in a second direction to fully close said poppet valve, said solenoid means being operable to selectively drive said core means in each of said first and second directions in response to selective energization of said solenoid means;

connector means for mechanically coupling said poppet valve to said core means so that movement of said core means in said first and second directions moves said poppet valve between said fully open and fully closed positions.

32. In a vacuum die casting equipment of the type which includes a vacuum source that is capable of being in communication with the die casting cavity when an elongated poppet-type vacuum valve is open to thereby remove air from the cavity, apparatus for positively fully opening and fully closing said poppet-type vacuum valve that is capable of translating movement between its open and closed positions, said apparatus comprising:

double acting solenoid means having a core means that is moveable in first and second directions, said solenoid means being operable to selectively drive said core means in each of said first and second directions to said respective fully open and fully closed positions in response to selective energization of said solenoid means;

connector means for mechanically coupling said poppet valve to said core means so that movement of said core means in said first and second directions moves said poppet valve between said fully open and fully closed positions.

33. A vacuum die casting valve opening and closing apparatus, the valve being a poppet valve that is capable of translational movement between its fully open and fully closed positions, said apparatus comprising:

solenoid means having a core means that is moveable in first and second directions, said solenoid means being operable to drive said core means in said first direction to rapidly fully open said poppet valve in response to energization of said solenoid means;

connector means for mechanically coupling said poppet valve to said core means so that movement of said core means in said first and second directions moves said poppet valve between open and closed positions; and means operatively connected to one of said poppet valve and said core means for biasing the same in said second direction, so that said poppet valve is moved to said fully closed position when said solenoid means is not energized.

34. In vacuum die casting equipment of the type which includes a vacuum source that is capable of being in communication with the die casting cavity when an elongated poppet-type vacuum valve is open to thereby remove air from the cavity, apparatus for positively opening and closing said poppet-type vacuum valve that is capable of translating movement between its open and closed positions, said apparatus comprising:

solenoid means having a core means that is moveable in first and second directions, said solenoid means being operable to rapidly drive said core means in said first direction to fully open said poppet valve in response to energization of said solenoid means;

connector means for mechanically coupling said poppet valve to said core means so that movement of said core means in said first and second directions moves said poppet valve between open and closed positions; and, means operatively connected to one of said poppet valve and said core means for biasing the same in said second direction, so that said poppet valve is moved to said closed position when said solenoid means is not energized.

* * * * *